United States Patent [19]

Fujita

[11] Patent Number: 4,613,178
[45] Date of Patent: Sep. 23, 1986

[54] SIDE MOLD FOR AN AUTOMOBILE

[75] Inventor: Tamio Fujita, Akashi, Japan

[73] Assignee: Kanegafuchi Kagaku Kogyo Kabushiki Kaisha, Osaka, Japan

[21] Appl. No.: 693,941

[22] Filed: Jan. 23, 1985

[30] Foreign Application Priority Data

Jan. 26, 1984 [JP] Japan .................. 59-9778[U]

[51] Int. Cl.[4] ............................................ B60R 19/42
[52] U.S. Cl. .................................. 293/128; 264/177 R; 264/171
[58] Field of Search ................................ 293/128, 102; 264/177 R, 171

[56] References Cited

U.S. PATENT DOCUMENTS

| 3,811,989 | 5/1974 | Hearn | 264/177 R X |
| 3,843,475 | 10/1974 | Kent | 264/177 R X |
| 4,246,303 | 1/1981 | Townsend | 293/128 X |
| 4,277,526 | 7/1981 | Jackson | 293/128 X |
| 4,353,584 | 10/1982 | Lovett | 293/128 X |
| 4,360,549 | 11/1982 | Ozawa et al. | 293/128 X |
| 4,393,022 | 7/1983 | Handl | 264/171 X |
| 4,552,714 | 11/1985 | Krueger et al. | 264/171 |

FOREIGN PATENT DOCUMENTS

| 912303 | 5/1954 | Fed. Rep. of Germany | 293/128 |
| 1965571 | 7/1971 | Fed. Rep. of Germany | 293/128 |

Primary Examiner—Robert B. Reeves
Assistant Examiner—Russell D. Stormer
Attorney, Agent, or Firm—Armstrong, Nikaido, Marmelstein & Kubovcik

[57] ABSTRACT

A side mold to be fixed onto a side of automobile body, comprising (A) a hard mold portion forming an outside main portion and (B) a soft mold portion forming an inner foot portion to be contacted with the side of automobile body; the hard mold portion being made of a blend of (a-1) a vinyl chloride polymer and (a-2) an ABS resin comprising a copolymer (i) of α-methylstyrene, styrene, acrylonitrile and methyl methacrylate and a graft-polymer (ii) in which at least one component of the copolymer is graft-polymerized onto a butadiene rubber; and the soft mold portion being made of a plasticized polyvinyl chloride and having a JIS-A hardness of 50° to 90°.

The side mold is light even if the side mold is made large, and has sufficient strength, surface hardness and shock observer effect.

2 Claims, 3 Drawing Figures

SIDE MOLD FOR AN AUTOMOBILE

BACKGROUND OF THE INVENTION

The present invention relates to a side mold for an automobile, which is employed for preventing damage of an automobile body and for decorating the automobile. Particularly, the present invention relates to a side mold being made of synthetic resin comprising a hard mold portion (A) forming a outside main portion and a soft mold portion (B) forming an inside portion to be connected with a side of an automobile body, and having a hard surface and sufficient resistance against heat-deformation or attack of outer force or solvent.

A side mold is effective not only as a decoration of the automobile body but also as a protector of the side of an automobile body, for instance, doors; or the front or rear portions of the both sides of the body, against deformation of the body or damage to the coatings when a side portion of the body receives a slight impact attack or a contact. It is recently required that the body of an automobile also be lighter in order to save fuel, because of the trend toward saving energy in the automobile industry.

A conventional side mold is made of a metal, a combination of a metal core and a mold of plasticised polyvinyl chloride covering the metal core, or a mold of only propylene polymers, or the like. Such side mold is horizontally aligned and attached as a line onto the side panel of the automobile body by means of screws or clips. The side mold has increased in size due to necessity of improving the decorational effect and increasing protection for the body against impact or the like. However, it is further required that the weight of the body be reduced.

Under the above condition, a material for a side mold is required to provide lightness, sufficient strength against impact even at low temperature, e.g. $-30°$ to $-10°$ C., surface hardness which is not easily damaged, and wide selectivity in design as to configuration, surface decoration, or the like.

However, the conventional material described above does not possess all of those complicated and contradictory properties.

The object of the present invention is to provide a side mold having all of the above properties.

SUMMARY OF THE INVENTION

In accordance with the present invention, there is provided a side mold for an automobile comprising (A) a hard mold portion forming an outer main portion and (B) a soft mold portion forming an inner foot portion to be contacted with a side of the automobile body;

the hard mold portion (A) being made of a blend of (1) 80 to 40 parts by weight of a vinyl chloride polymer and (2) 20 to 60 parts by weight of an ABS resin;

the ABS resin comprising (i) a copolymer of 30 to 80% by weight of α-methylstyrene, 0 to 30% by weight of styrene, 10 to 30% by weight of acrylonitrile and 0 to 30% by weight of methyl methacrylate, and (ii) a graft polymer in which at least one component of said copolymer (i) is a graft-polymerized onto a butadiene rubber;

the soft mold portion (B) being made of a plasticized polyvinyl chloride and having a JIS-A hardness of 50° to 90°.

DETAILED DESCRIPTION OF THE INVENTION

Figure 2:
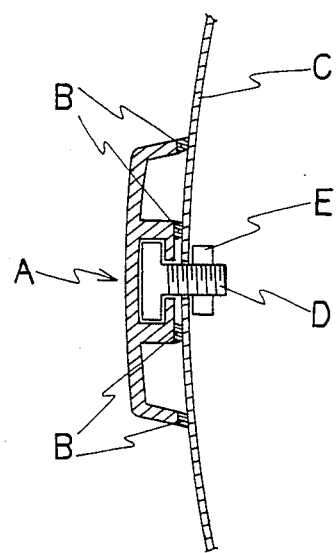
FIG. 2 is a schematic cross sectional view of an example of an automobile body on which the side mold shown in FIG. 1 is fixed.
Figure 3:
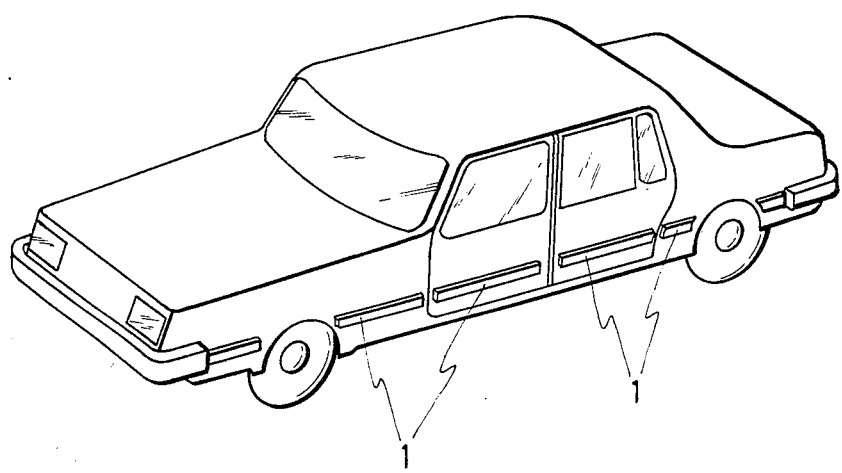
FIG. 3 is a schematic perspective view of an automobile provided with an embodiment of the side mold of the present invention.

In the drawings 1 and 2, "A" is a hard mold portion forming an outside main portion of the side mold 1 shown in FIG. 3. The hard mold portion (A) is required to have a surface-hardness and an ornamental effect. "B" is a soft mold portion which is arranged between the hard mold portion (A) and the side panel (C) of the automobile body and which functions as a shock absorber against a received impact attack so that the impact does not transmit toward the automobile body. In an embodiment of side mold shown in FIG. 2, the side mold is fixed to the side panel (C) by means of screws (D) and nuts (E).

The ABS resin (a-2) employed in the pesent invention is a resin-composition containing a copolymer (i) of 30 to 80% by weight of α-methylstyrene, 0 to 30% by weight of styrene, 10 to 30% by weight of acrylonitrile and 0 to 30% by weight of methyl methacrylate, and a graft polymer (ii) in which at least one component of said copolymer (i) is graft-polymerized onto a butadiene rubber. Particularly, it is preferable that the butadiene rubber or the styrene-butadiene rubber as a trunk polymer for the graft-polymer be in granular form having an average granule diameter of 0.05 to 1 $\mu m\phi$. Further, it is preferable that the amount of the butadiene rubber is 10 to 30% by weight of the total amount of the ABS resin.

It is preferable that the hard mold portion (A) forming the outside main portion in the present invention contain vinyl chloride polymer (a-1) and ABS resin (a-2) in a ratio of 80:20 to 40:60 by weight. When the proportion of polyvinyl chloride is more than 80% by weight, heat resistance (resistance against heat deformation) and impact strength at low temperature become insufficient. When the proportion of polyvinyl chloride is less than 40% by weight, resistance against solvent, particularly against gasoline, decreases.

It is preferable that the plasticized polyvinyl chloride employed in the soft mold portion (B) being contacted with the side panel (C) of the automobile body be in the range of JIS-A hardness of 50° to 90°.

The term "JIS-A hardness" as employed herein means a hardness measured by a spring type hardness tester (model A) provided in Japanese Industrial Standards (JIS) K 6301.

Such polymer within the above range can be obtained by blending about 25 to 100 parts by weight of plasticizer and 100 parts by weight of polyvinyl chloride. Since the side mold is provided with the soft mold portion (B) to be contacted with the side panel of automobile body, the damage received at the time when the side mold is fixed onto the side panel of the body or at the time when the side mold is removed from the side panel of the body is minimal, and the side mold can more smoothly fit along the side panel of the body.

The side mold of the present invention can be obtained by respectively molding the hard mold portion (A) and the soft mold portion (B), and further joining them with each other through adhesive binder or mechanical joining means. As a further preferable method, the side mold can be formed at the same time by means of die-extrusion, particularly by coextruding those two types of resin into one body.

Another advantage of the present invention is that it is not necessary to sort the waste resins resulting from the portions (A) and (B) upon forming and processing the mold and the mixture of the waste resins resulting from the portions (A) and (B) can be reused, as a material for forming the portion (A). In that case, it is preferable that the plasticized polyvinyl chloride be contained in the mixture in an amount up to about 10% by weight. The reason is that the material of the hard mold portion (A) containing vinyl chloride polymer and ABS resin and the material of the soft mold portion (B) are compatible with each other, unlike a combination of propylene polymers and plasticized polyvinyl chloride.

As advantages of the side mold of the present invention, the impact resistance is so high that the side of automobile body can be sufficiently protected, and the solvent resistance is high. Further, the side mold of the invention can be freely colored by selecting a pigment to be employed, and also can be decorated by means of coating, printing, or metal-plating onto the surface of the side mold. Various molding methods such as embossing and multi-colored forming can be utilized.

The present invention is more specifically described and explained by means of the following Examples, in which all parts and % are by weight unless otherwise noted. It is to be understood that the present invention is not limited to the Examples, and various changes and modifications can be made in the invention without departing form the spirit and scope thereof.

EXAMPLES 1 TO 3

As an ABS resin, there were employed a resin consisting of 70 parts of copolymer of 50% of α-methylstyrene, 25% of acrylonitrile and 25% of styrene; and 30 parts of graft copolymer containing 60% of polybutadiene onto which 28% of styrene and 12% of acrylonitrile are graft-polymerized.

As a material of the outside hard mold portion (A), there was employed three types of admixtures in which polyvinyl chloride (commercially available under the commercial name "Kanevinyl S-1001" made by Kanegafuchi Kagaku Kogyo Kabushiki Kaisha) and the above ABS resin were admixed in the weight ratio of 75:25 (Example 1), 60:40 (Example 2) and 45:55 (Example 3) as shown in Table 1. To each of the admixtures, there was added 3 parts of stabilizer (butyl-tin stabilizer), 1.5 parts of lubricant (hydrocarbon wax) and 0.5 part of pigment (carbon black) to 100 parts of the polymer in order to prepare three types of the admixed material.

On the other hand, as a soft mold portion (B) to be contacted with the automobile body, there was prepared an admixture consisting of 100 parts of polyvinyl chloride (commercially available under the commercial name "Kanevinyl S-1003", made by Kanegafuchi Kagaku Kogyo Kabushiki Kaisha), 60 parts of plasticizer (DIDP), 4.0 parts of stabilizer (barium-zinc composite stabilizer), 2 parts of pigment (carbon black) and 20 parts of filler (finely divided calcium carbonate). The soft mold portion (B) had a JIS-A hardness of 87°.

The above hard polymer admixture is supplied into a main extruder, and the above soft polymer admixture is supplied into a sub-extruder. Then, those two types of resin (temperature of dies: 180° C.) are coextruded in order to obtain samples of side mold having a cross sectional configuration shown in FIG. 1.

The heat deformation resistance of each obtained sample was measured after the sample is treated at 80° C. for 2 hours in an oven. A 300 g steel ball was dropped on each sample at −30° C. from a height of 500 mm in order to measure the impact strength by the falling ball impact test (represented by % based on the breakage rate of samples). The hardness of the outside hard portion (scratch resistance) was measured by a pencil having a pencil hardness of 2H. The sample was dipped in gasoline at room temperature for 10 minutes to observe the change of luster by eye (solvent resistance). The results of the above measurements are shown in Table 1.

COMPARATIVE EXAMPLES 1 AND 2

As a material of the outside hard mold portion (A), polyvinyl chloride (commercially available under the commercial name "Kanevinyl S-1001" made by Kanegafuchi Kagaku Kogyo Kabushiki Kaisha) and the above ABS resin were employed to admix in the weight ratio of 90:10 (Comparative Example 1) and 20:80 (Comparative Example 2) as shown in Table 1, and further the above-mentioned stabilizer, lubricant and pigment were added to the material to prepare two types of the admixed material. A sample of side mold having the cross sectional configuration shown in FIG. 1 was made by the same manner as in Example 1. The physical properties of the samples were measured. The results are shown in Table 1.

COMPARATIVE EXAMPLE 3

Figure 1:
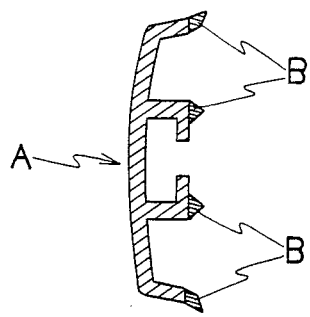
FIG. 1 is a cross sectional view of an embodiment of the side mold of the present invention.

A sample having the cross sectional configuration shown in FIG. 1 was made by means of coextruding a rigid polyvinyl chloride to which were admixed the same stabilizer, lubricant and pigment as in Example 1 without ABS resin, and the same plasticized polyvinyl chloride as in Example 1. The physical properties of the sample are shown in Table 1.

COMPARATIVE EXAMPLE 4

A sample having the cross sectional configuration shown in FIG. 1 was made by means of injection molding employing a polypropylene polymer (commercially available under the registered trade mark "Noblen JS-M" made by MITSUI TOATSU CHEMICALS, INC.). The physical properties of the sample are shown in Table 1.

TABLE 1

|  | Admixed ratio of hard portion (PVC/ABS) | Heat resistance (Deformation at 80° C. for 2 hours) | Impact strength* (%) | Surface hardness (Resistance against pencil) | Resistance to gasoline |
| --- | --- | --- | --- | --- | --- |
| Example 1 | 75/25 | No deformation | 0 | Good | No change |
| Example 2 | 60/40 | No deformation | 0 | Good | No change |
| Example 3 | 45/55 | No deformation | 0 | Good | No change |

TABLE 1-continued

| | Admixed ratio of hard portion (PVC/ABS) | Heat resistance (Deformation at 80° C. for 2 hours) | Impact strength* (%) | Surface hardness (Resistance against pencil) | Resistance to gasoline |
|---|---|---|---|---|---|
| Comparative Example 1 | 90/10 | Large deformation | 90 | Good | No change |
| Comparative Example 2 | 20/80 | No deformation | 0 | Good | Lower luster |
| Comparative Example 3 | 100/0 | Large deformation | 90 | Good | No change |
| Comparative Example 4 | 100% of polypropylene | — | — | Bad (damaged) | No change |

*by falling ball impact test

What is claimed is:

1. A side mold for an automobile comprising (A) a hard mold portion forming an outside main portion and (B) a soft mold portion forming an inner portion to be contacted with a side of the automobile body; the hard mold portion (A) being made of a blend of (1) 80 to 40 parts by weight of a vinyl chloride polymer and (2) 20 to 60 parts by weight of an ABS resin; said ABS resin comprising (i) a copolymer of 30 to 80% by weight of α-methylstyrene, 0 to 30% by weight of styrene, 10 to 30% by weight of acrylonitrile and 0 to 30% by weight of methyl methacrylate, and (ii) a graft polymer in which at least one component of said copolymer (i) is graft-polymerized onto a butadiene rubber;

the soft mold portion (B) being made of a plasticized polyvinyl chloride and having a JIS-A hardness of 50° to 90°.

2. The side mold of claim 1, wherein said hard mold portion (A) and said soft mold portion (B) are coextruded.

* * * * *